June 29, 1943.  H. A. KNOX  2,322,785
SUSPENSION
Filed March 27, 1942   2 Sheets-Sheet 1

Inventor
Harry A. Knox
By G. J. Kessenich & J. H. Church
Attorneys

June 29, 1943.  H. A. KNOX  2,322,785
SUSPENSION
Filed March 27, 1942   2 Sheets-Sheet 2
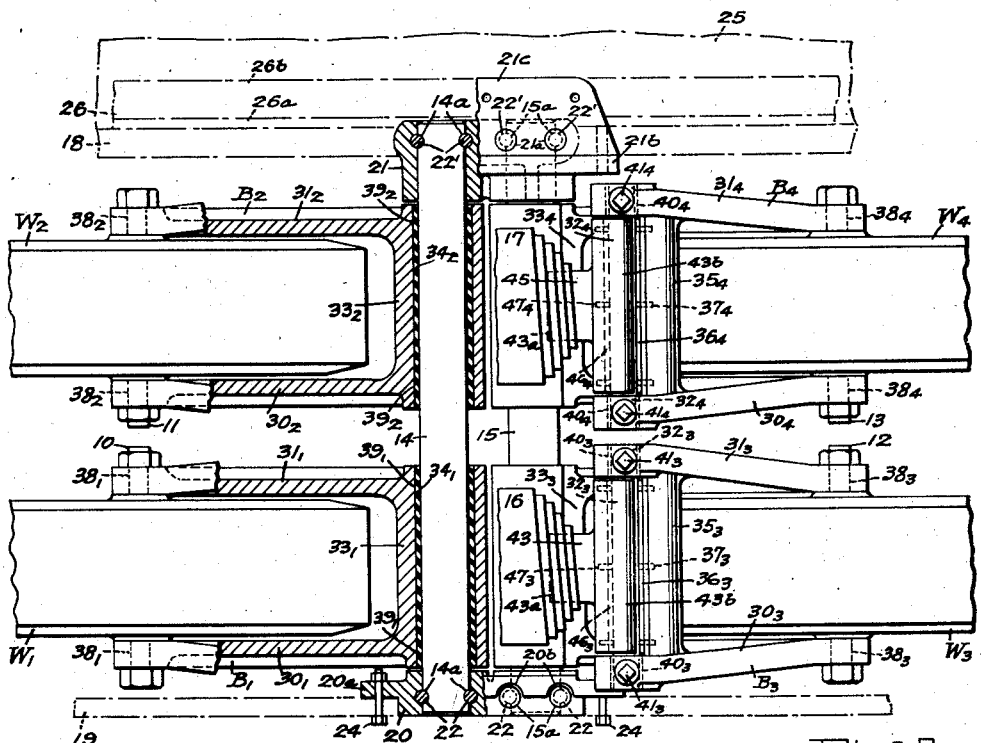
Fig. 4.
Fig. 5.
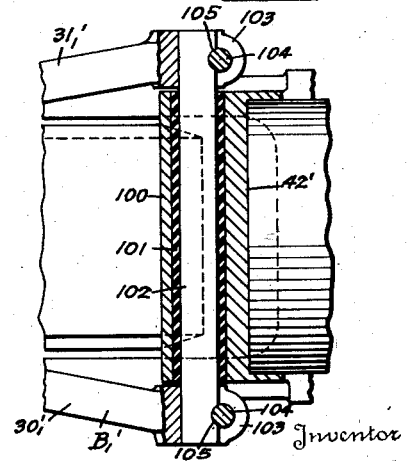
Fig. 6.
Inventor
Harry A. Knox
By G. J. Kessenich & J. H. Church
Attorneys Patented June 29, 1943

2,322,785

UNITED STATES PATENT OFFICE 2,322,785

SUSPENSION

Harry A. Knox, Washington, D. C.

Application March 27, 1942, Serial No. 436,389

8 Claims. (Cl. 267—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a suspension for a vehicle.

An object of this invention is to provide a wheel suspension for use on track laying vehicles.

Another object of this invention is to provide a wheel suspension similar to the wheel suspensions described and claimed in my copending applications, Serial No. 399,661, filed June 25, 1941, and Serial No. 423,888, filed December 22, 1941. But in this instance the wheel suspension is adapted to carry greater loads efficiently and yet be of a simple and compact nature. A similar suspension is also shown in my copending application, Serial No. 425,717 filed January 6, 1942.

Another object of this invention is to provide means for pivotally mounting a plurality of wheel axles on a common supporting member.

Another object of this invention is to provide an improved bearing in a wheel suspension.

The specific nature of the invention as well as other objects and advantages thereof will clearly appear from a description of a preferred embodiment as shown in the accompanying drawings in which:

Figure 1 discloses a side elevation of a suspension including the preferred embodiment of my invention.

Figure 4 is a plan view of the suspension shown in Figure 1 and includes a section taken substantially on the line 4—4 of Figure 1.

Figure 5 is a side elevation of a modified rubber bushed connection between a spring seat and one of the pivotable arms shown in Figures 1-4, and Figure 6 is a section of a modified rubber bushed connection taken substantially on the line 6—6 of Figure 5.

Figure 1:
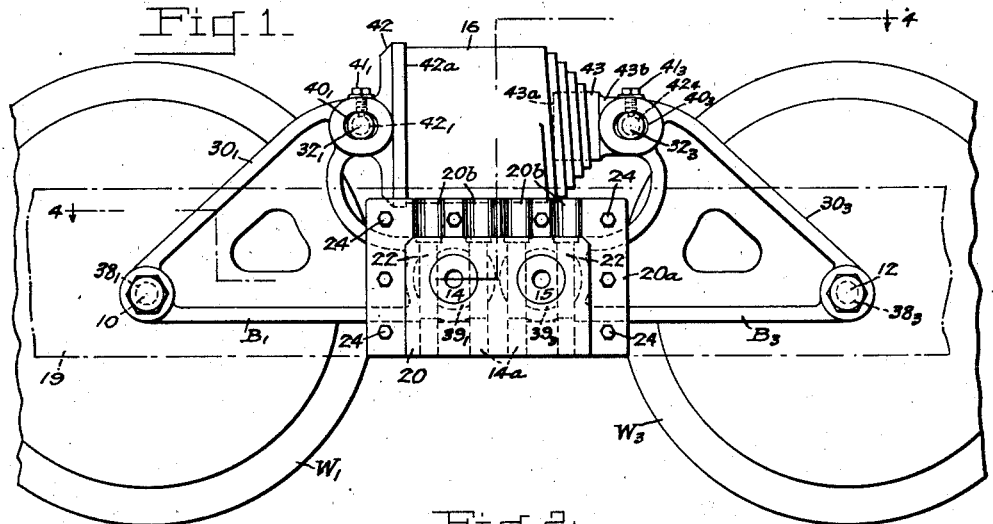

The purpose of the arrangement disclosed herein is to pivotally mount wheel axles 10, 11, and wheel axles 12, 13 about shafts or axles 14, 15 respectively with volute spring 16 between wheel axle 10 and wheel axle 12 and with volute spring 17 between wheel axle 11 and wheel axle 13.

Figure 3:
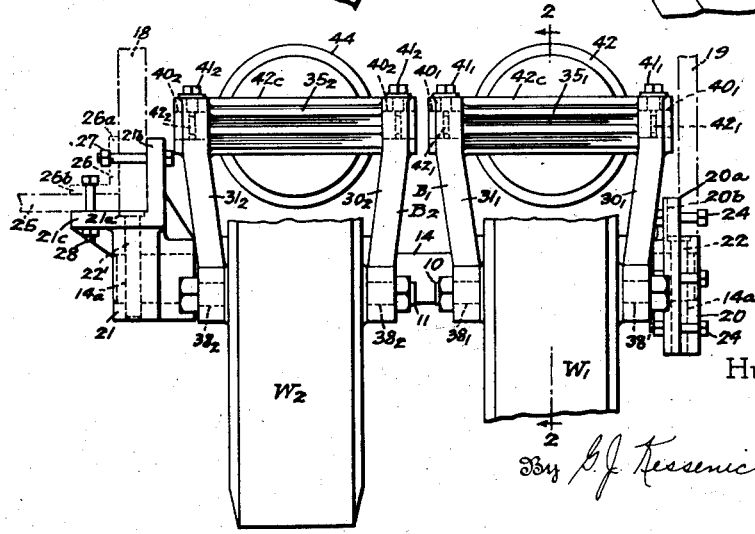
Figure 3 is an end elevation of the suspension shown in Figure 1.

The wheel suspension proper is mounted on the two oppositely disposed frame members, 18, 19 rigidly depending from the vehicle body (not shown). Opposite ends of supporting axles 14, 15 are held fast in the end bearing members 20, 21 by means of cylindrical body portions of pins 22, 22' that pass through and engage recesses 14a, 15a in the ends of shafts or axles 14, 15. Pins 22, 22' are held from sliding through holes in their corresponding bearing members 20, 21 due to the heads on pins 22, 22'. The bearing member 20 is provided with the inverted U-shaped flange 20a in which there are clearance recesses 20b for the passage of pins 22 in assembly and through which bolts 24 or other similar means pass in order to rigidly connect the end bearing member 20 to the frame member 19. Preferably the bearing member 20, frame member 19 and flange 20a are disposed and dimensioned such that the outer surface of frame member 19 is flush with the corresponding outer surface of the bearing member 20 as seen in Fig. 3 and frame member 19 serves to retain pin 22 in locking position.

Fastening pin 22' is provided with a head which is insertable in cooperating bearing member recess 21a; and, frame member 18 is positioned over the head of pin 22' whereby pin 22' is maintained in position.

Bearing member 21 is fastened to vehicle vertical frame member 18 and horizontal vehicle frame member 25 by providing the bearing member 21 with vertical flange 21b and horizontal flange 21c, and then sandwiching the frame members 18, 25 between corresponding flange members and corresponding elements, 26a, 26b of angle iron 26 by means similar to bolts 27, 28.

Each one of the wheels $W_1$, $W_2$, $W_3$, $W_4$, is supported on its wheel axle 10, 11, 12, 13, respectively, which is held by and pivotally mounted on corresponding shafts or axles 14, 15, by means of pivotable arms or supports $B_1$, $B_2$, $B_3$, $B_4$; only one of the pivotable supports or arms $B_1$ is described, but it is understood that the other three pivotable supports or arms $B_2$, $B_3$, $B_4$ are of similar design and the component parts thereof have the same reference numerals with corresponding subscripts.

Pivotable support or arm $B_1$ comprises two triangular shaped arms $30_1$, $31_1$ extending mutually parallel with axial hollow portions $38_1$, $39_1$, $40_1$, at the corner of each triangle for the reception of transversely extending connecting members comprising: wheel shaft 10, axle 14, and hardened contact pin or rod $32_1$.

Although arms $30_1$, $31_1$ are each made in one piece, for the purpose of analysis of my invention, each of those arms is equivalent to a structure having two arms joined to form hollow portion $39_1$ and extending respectively to include hollow portions $38_1$, $40_1$.

The triangular shaped arms $30_1$, $31_1$ are formed integral with and joined by sleeve $33_1$ which is adapted to have included within its hollow portion rubber bushing $34_1$ and axle or shaft $14$ whereby a tight resilient connection between support $B_1$ and shaft $14$ is provided, said connection allowing resilient pivotable movement of support $B_1$ around shaft or axle $14$.

Figure 2:
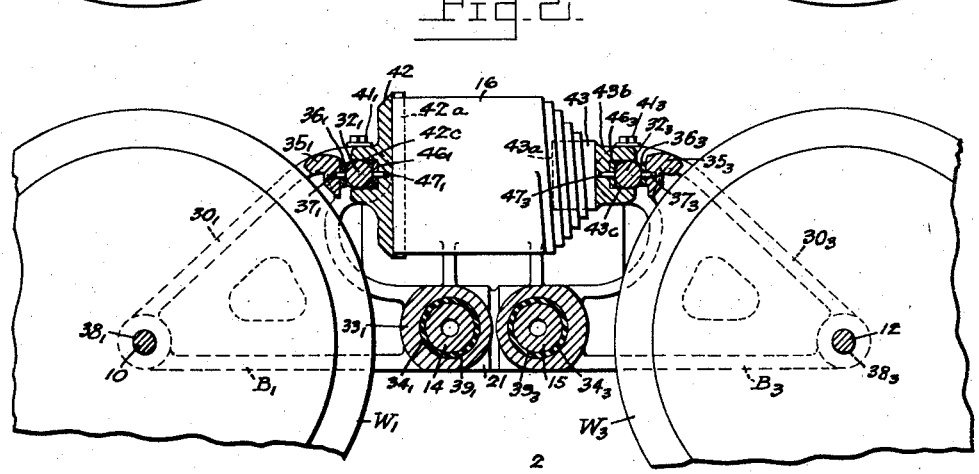
Figure 2 is a longitudinal section taken substantially on the line 2—2 of Figure 3.

The upper corners of triangular shaped arms $30_1$, $31_1$ are joined by an integrally formed transversely extending brace $35_1$ (Fig. 2) having a hardened contact bar $36_1$ mounted thereon by means similar to pins $37_1$ for a purpose to be described later.

The hardened contact pin or rod $32_1$ is held in the oppositely disposed hollow portions $40_1$—$40_1$ of arm $B_1$ in such a manner so as to permit rotational movement of pin or rod $32_1$ and yet prevent its axial movement. For this purpose the hollow portions $40_1$—$40_1$ are made somewhat elliptical in cross section as seen in Fig. 1 and the body portions of screw threaded bolts $41_1$—$41_1$ extend into circumferential grooves $42_1$—$42_1$ in the contact rod $32_1$. When the contact rod $32_1$ is assembled on the pivotable support $B_1$ contact bar holding pins $37_1$ are prevented from becoming disengaged, thus securing the position of hardened contact bar $36_1$.

The two volute springs $16$, $17$, are held solely by their corresponding axially disposed spring seats $42$, $43$ and $44$, $45$, respectively, in a manner described in my last two mentioned copending applications. Specifically, spring seat $42$ (similar spring seat $44$) is provided with a flange $42a$ (Fig. 1) which partially encircles the outer circumference of volute spring $16$; spring seat $43$ (similar spring seat $45$) has a cylindrical projection $43a$ insertable in the hollow portion of the spring $16$ at the smaller diameter end and is provided with a transversely extending portion $43b$ adapted to abut the spring at its smaller diameter end.

The outer surface of spring seats $42$, $43$ is provided with a channel $42c$, $43c$ wherein hardened contact bars $46_1$, $46_3$ are held by means similar to pins $47_1$, $47_3$ and whereon contact rods $32_1$, $32_3$, respectively, abut.

It is thus seen that by disposing hardened contact bars $36_1$, $46_1$ and contact pin or rod $32_1$ in the manner described above a rugged, oil free bearing is provided and this bearing is characterized by the two line contacts between the hardened contact rod or pin and oppositely disposed hardened contact bars. These replaceable hardened contact bars $36_1$, $46_1$ have a plane bearing surface and the contact pin or rod $32_1$ is cylindrical.

When loads on the suspension are applied and released the contact rod $32_1$ rotates and a line contact is made continuously along not one definite line on the contact rod but many different lines with the result that wear of the contact pin or rod $32_1$ is distributed and thus the cylindrical cross section of the contact rod tends to be maintained.

It is apparent that the wheels $W_1$, $W_2$, $W_3$, $W_4$ may be assembled on their respective axles by one skilled in the art; accordingly, no means for doing this is disclosed.

It is also apparent that stops may be provided for limiting the relative movement of the wheels $W_1$, $W_2$, $W_3$, $W_4$ with respect to the vehicle frame members $18$, $19$ and that the volute springs may be prestressed by using expedients similar to those described in my last two mentioned copending applications whereby definite contact between contact rods and corresponding contact bars is assured. Also, the pivotable support $B_1$ may be mounted on axle $14$ by means of a lubricated connection and to the spring seat $42$ by means of a lubricated connection as disclosed in my above mentioned copending application, Serial No. 423,888.

Figs. 5 and 6 disclose a rubber bushed bearing which may be substituted for the line contact bearing shown in Figs. 1-4. With such a substitution each individual wheel support or arm $B_1$, $B_2$, $B_3$ or $B_4$ has two rubber bushed bearings which are stressed when that particular support moves relative to the frame. The spring seat $42'$ similar to seat $42$ shown in the previous Figures 1-4 has its outer surface modified such that a tube $100$ is formed integral therewith by welding, brazing, casting, or other similar means and with the axis of the tube extending parallel to the same axis as did contact pin or rod $32_1$ in the previous figures. A rubber bushing $101$ adapted to withstand compression and particularly torsion resiliently separates shaft $102$ from the inner wall of tube $100$ throughout its length.

Triangular shaped arms $30_1'$, $31_1'$ similar to arms $30_1$, $31_1$ of the previous figures have their upper corners modified as indicated in Figs. 5 and 6.

A U-clamp $103$ is provided and formed integral with the upper ends of triangular shaped members $30_1'$, $31_1'$. The parallel legs of the U-clamp $103$ are so spaced and the inner curvature between the parallel legs is such that the ends of shaft $102$ (Fig. 5) are snugly received in the clamps. A bolt $104$ passing through one leg of the U and passing through groove $105$ in the shaft end and screw threadedly engaging the other leg of the U serves to lock shaft $102$ to support $B_1'$ which is similar to support $B_1$ in the previous figures.

The spring seats disclosed in the drawings are of a channel or U-shaped cross section and a replaceable hardened bar abuts the inner horizontal surface of the U-shaped member; it is understood however that the inner horizontal surface of the U-shaped member may be surface hardened by flame hardening or induction heating and a suitable spring seat bearing surface may be thus obtained.

I claim:

1. A vehicle suspension embodying a pair of arms pivoted about parallel axes and adapted to hold a wheel axle on their free ends, each of said arms having an extension which comprises a second arm, a spring having two relatively movable ends, a movable seat for each of said spring ends and having an external plane bearing surface, a plane bearing surface on the free end of said second arm, a cylindrical member mounted on the free end of each of said second mentioned arms and coacting with the first and second mentioned plane bearing surfaces.

2. A vehicle suspension embodying a pair of arms pivoted about parallel axes and adapted to hold a wheel axle on their free ends, each of said arms having an extension which comprises a second arm, a spring having two movable ends, a movable seat for each of the spring ends and having an external plane bearing surface, each of said second mentioned arms having a plane bearing surface on the free end thereof, a cylindrical member rotatably mounted at the free ends of the second mentioned arms and coacting with the first and second mentioned plane bearing surfaces.

3. A vehicle suspension embodying a pair of arms pivoted about parallel axes and adapted to hold a wheel axle on their free ends, each of said arms having an extension which comprises a second arm, a volute spring having two movable ends, a movable seat for one of the spring ends and having an external plane bearing surface, flanges on said seat and partially encircling the spring, a second movable seat for said spring and having an external plane bearing surface and an extension on the surface adjacent the spring projecting within the center of the volute spring, each of said second mentioned arms having a plane bearing surface on the free end thereof, and a cylindrical member carried by each of said arms and disposed between the plane bearing surfaces on the free ends of the second mentioned arms and adjacent plane bearing surfaces on the free ends of adjacent spring seats.

4. In a vehicle suspension, two spaced parallel shafts, a pair of arms pivoted about each one of the spaced parallel shafts and adapted to hold a wheel axle on their free ends, a tubular member joining the arms which comprise a pair, said tubular member being concentrically mounted on the corresponding shaft, bearing material disposed between and spacing each tubular member and its shaft, each of said arms having an extension which comprises a second arm, a resilient member having two movable ends, a movable seat for one end of the resilient members, a movable seat for the other end of the resilient member, and means comprising a rubber bushing connection for joining the free end of each second mentioned arm to the adjacent movable seat.

5. In a vehicle suspension, two spaced parallel shafts, means for holding the shafts stationary and in spaced relationship, a tubular member concentrically mounted on each shaft, resilient material disposed between and spacing each shaft and its concentric member, said resilient material extending continuously and substantially the entire length of the tubular member, an extension on the tubular member and adapted to hold a wheel axle on its free end, an arm extending from each tubular member and having a free end, a resilient member having two movable ends and disposed with said ends adjacent the free ends of the arms, and a rubber bushing connection for coupling adjacent free ends of the arms and adjacent ends of the resilient member.

6. A vehicle suspension embodying an arm pivoted about an axis and adapted to hold a wheel axle on its free end, a second arm rigidly connected to said arm and pivoted about the same axis, a spring having two ends, means for coupling one of the spring ends to the vehicle body, a movable seat for the other spring end, said movable seat having a portion with a U-shaped cross section, a hardened bar abutting the inner surface of the horizontal portion of the U-shaped spring seat, said second arm having a hardened contact bar mounted thereon, a hardened pin mounted on said second arm and disposed between the first and second mentioned contact bars.

7. A vehicle suspension embodying an arm pivoted about an axis and adapted to hold a wheel axle on its free end, a second arm rigidly connected to said arm and pivoted about the same axis, a spring having two ends, means for coupling one of the spring ends to the vehicle body, a movable seat for the other spring end, said movable seat having a portion with a U-shaped cross section, said movable seat having the inner surface of the horizontal portion of the U hardened, said second arm having a hardened contact surface, and a hardened pin mounted on the free end of said second arm and contacting the first and second mentioned hardened surfaces.

8. The same as in claim 7 and means for rotatably mounting said hardened pin on the free end of said second arm.

HARRY A. KNOX.